(12) United States Patent
Ouellette

(10) Patent No.: US 12,214,898 B2
(45) Date of Patent: Feb. 4, 2025

(54) CREW ALERTING SYSTEMS AND METHODS FOR MOBILE PLATFORMS

(71) Applicant: BOMBARDIER INC., Dorval (CA)

(72) Inventor: Benoit Ouellette, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 18/515,381

(22) Filed: Nov. 21, 2023

(65) Prior Publication Data

US 2024/0083594 A1 Mar. 14, 2024

Related U.S. Application Data

(63) Continuation of application No. 17/501,488, filed on Oct. 14, 2021, now Pat. No. 11,858,654, which is a
(Continued)

(51) Int. Cl.
*B64D 45/00* (2006.01)
*B64D 43/00* (2006.01)
*G06Q 50/40* (2024.01)

(52) U.S. Cl.
CPC .......... *B64D 45/00* (2013.01); *B64D 43/00* (2013.01); *G06Q 50/40* (2024.01); *B64D 2045/007* (2013.01); *B64D 2045/0085* (2013.01)

(58) Field of Classification Search
CPC ...... B64D 2045/007; B64D 2045/0085; B64D 43/00; B64D 45/00; G06Q 50/30; G06Q 50/40
(Continued)

(56) References Cited

U.S. PATENT DOCUMENTS

| 8,103,393 B2 * | 1/2012 | Ausman | G01D 7/00 340/963 |
| 2005/0192717 A1 * | 9/2005 | Tafs | G08G 5/0013 701/3 |

(Continued)

OTHER PUBLICATIONS

PCT International Search Report and Written Opinion dated Jun. 29, 2017 re: International Patent Application No. PCT/IB2017/052518.
(Continued)

*Primary Examiner* — Naomi J Small
(74) *Attorney, Agent, or Firm* — Norton Rose Fulbright Canada LLP

(57) ABSTRACT

Systems, devices and methods for alerting a crew of an aircraft or other mobile platform of a relevant condition associated with the aircraft are disclosed. One exemplary method comprises receiving data indicative of an existence of the relevant condition associated with the aircraft; receiving data indicative of a substantially real-time value of a dynamic parameter associated with the relevant condition; and displaying an awareness-enhancing indication associated with the relevant condition in a display area of the crew alerting system of the aircraft. The awareness-enhancing indication comprises a textual message and a supplemental indication indicative of the substantially real-time value of the dynamic parameter associated with the relevant condition. In various embodiments, the supplemental indication may be textual or graphical. The supplemental indication may also be indicative of a target value of the dynamic parameter.

8 Claims, 5 Drawing Sheets

Related U.S. Application Data continuation of application No. 16/098,253, filed as application No. PCT/IB2017/052518 on May 1, 2017, now Pat. No. 11,174,039.

(60) Provisional application No. 62/331,048, filed on May 3, 2016.

(58) Field of Classification Search
USPC .......................................................... 340/963
See application file for complete search history.

(56) References Cited

U.S. PATENT DOCUMENTS

| | | | |
|---|---|---|---|
| 2008/0154441 A1* | 6/2008 | Harrison | G01C 23/005 701/3 |
| 2010/0333040 A1* | 12/2010 | Palanisamy | G01C 23/00 715/854 |
| 2011/0001636 A1* | 1/2011 | Hedrick | B64D 43/00 340/945 |
| 2014/0032062 A1* | 1/2014 | Baer | G07C 5/08 701/99 |
| 2015/0112637 A1* | 4/2015 | Hiatt | B64C 27/008 702/182 |
| 2015/0348420 A1* | 12/2015 | Kneuper | G06F 3/04847 345/629 |
| 2016/0202950 A1* | 7/2016 | Hawley | G08G 5/0021 700/94 |
| 2017/0113810 A1* | 4/2017 | Saptharishi | G06F 1/163 |

OTHER PUBLICATIONS

Marty E. Hornsby, Engine Monitoring Display Study, Aug. 1992, NASA Contractor Report 4463, USA.

Ali Bahrami, Advisory Circular—Flightcrew Alerting, Dec. 13, 2010, AC No. 25.1322-1, U.S. Department of Transportation, Federal Aviation Administration, USA.

SAE International, Flight Deck Alerting System (FAS), Jul. 1988, SAE ARP4102/4, SAE, USA.

* cited by examiner

CREW ALERTING SYSTEMS AND METHODS FOR MOBILE PLATFORMS

CROSS-REFERENCE TO RELATED APPLICATION(S)

This application is a continuation of U.S. patent application Ser. No. 17/501,488 filed on Oct. 14, 2021 and incorporated herein by reference, which is a continuation of U.S. patent application Ser. No. 16/098,253 filed on Nov. 1, 2018 and incorporated herein by reference, which is a national stage application under 35 U.S.C. 371 of International Patent Application No. PCT/IB2017/052518 filed on May 1, 2017 and incorporated herein by reference, which claims priority to U.S. Provisional Patent Application Ser. No. 62/331,048, filed on May 3, 2016, the entire content of which is incorporated herein by reference.

TECHNICAL FIELD

The disclosure relates generally to crew alerting systems for aircraft and other mobile platforms, and more particularly to crew alerting systems providing awareness-enhancing indications.

BACKGROUND OF THE ART

Illuminated tiles including pushbuttons have been used to alert a flight crew of an aircraft of different kinds of caution or warning faults in an aircraft. A tile-based crew alerting system is typically limited because of the amount of space required due to each tile being associated with a single event. Other conventional crew alerting systems are configured to display text messages descriptive of a particular system problem on a display device part of an aircraft flight deck. Such centralized display-based crew alerting system typically has more flexibility and can support many (e.g., hundreds of) different messages. The combination of engine indications and such display-based crew alerting system is commonly known as an engine indication and crew alerting system (EICAS).

Alerting messages provided by conventional display-based crew alerting systems are textual messages typically of 18-21 characters and are organized in different colors corresponding to the level of the alert or relevant condition. These messages serve to alert the flight crew of system failures or inform the flight crew of a particular condition of a system of the aircraft. The messages are static in nature and the flight crew must often consult a source of information separate from the crew alerting system to supplement such messages.

SUMMARY

In one aspect, the disclosure describes a crew alerting system for a mobile platform. The system comprises:
  a display device defining a display area;
  a data processor operatively coupled to the display device; and
  machine-readable memory operatively coupled to the data processor and storing instructions executable by the processor and configured to cause the processor to:
    using data indicative of an existence of a relevant condition associated with the mobile platform and data indicative of a substantially real-time value of a dynamic parameter associated with the relevant condition where the dynamic parameter is indicative of an evolution of the relevant condition, generate an output for causing the display device to display an awareness-enhancing indication associated with the relevant condition in the display area, the awareness-enhancing indication comprising a textual message and a graphical indication indicative of the substantially real-time value of the dynamic parameter associated with the relevant condition.

The instructions may be configured to cause the processor to, using subsequent data indicative of the substantially real-time value of the dynamic parameter to cause the graphical indication to be updated based on the subsequent data.

The instructions may be configured to cause the textual message and the graphical indication to be displayed together as a single line item in the display area.

The instructions may be configured to cause the textual message and the graphical indication to be displayed laterally adjacent one another in the display area.

The instructions may be configured to cause the awareness-enhancing indication to also be indicative of a target value of the dynamic parameter.

The instructions may be configured to cause the graphical indication to also be indicative of a target value of the dynamic parameter.

The instructions may be configured to cause the graphical indication to be indicative of a difference between the substantially real-time value of the dynamic parameter and the target value of the dynamic parameter.

The instructions may be configured to cause the graphical indication to dynamically indicate a change in the substantially real-time value of the dynamic parameter relative to the target value of the dynamic parameter.

The target value of the dynamic parameter may be indicative of a conclusion of the relevant condition.

The instructions may be configured to cause the awareness-enhancing indication to be removed from the display area upon conclusion of the relevant condition.

In another aspect, the disclosure describes a display device for a crew alerting system of a mobile platform. The display device comprises:
  a display area associated with the crew alerting system of the mobile platform; and
  an awareness-enhancing indication displayed in the display area, the awareness-enhancing indication being associated with a relevant condition of the mobile platform, the awareness-enhancing indication comprising a textual message and a graphical indication indicative of a dynamic parameter associated with the relevant condition and indicative of an evolution of the relevant condition.

The textual message and the graphical indication may be displayed together as a single line item in the display area.

The textual message and the graphical indication may be displayed laterally adjacent one another in the display area.

The awareness-enhancing indication may also be indicative of a target value of the dynamic parameter.

The graphical indication may also be indicative of a target value of the dynamic parameter.

The graphical indication may be indicative of a difference between a substantially real-time value of the dynamic parameter and the target value of the dynamic parameter.

The graphical indication may dynamically indicate a change in the substantially real-time value of the dynamic parameter relative to the target value of the dynamic parameter.

The target value of the dynamic parameter may be indicative of a conclusion of the relevant condition.

In another aspect, the disclosure describes a method for alerting a crew of a mobile platform of a relevant condition associated with the mobile platform using a display area of a crew alerting system of the mobile platform. The method comprises:
- receiving data indicative of an existence of the relevant condition associated with the mobile platform;
- receiving data indicative of a substantially real-time value of a dynamic parameter associated with the relevant condition, the dynamic parameter being indicative of an evolution of the relevant condition; and
- displaying an awareness-enhancing indication associated with the relevant condition in the display area of the crew alerting system of the mobile platform, the awareness-enhancing indication comprising a textual message and a graphical indication indicative of the substantially real-time value of the dynamic parameter associated with the relevant condition.

The method may comprise:
- receiving subsequent data indicative of the substantially real-time value of the dynamic parameter; and
- causing the graphical indication to be updated based on the subsequent data.

The textual message and the graphical indication may be displayed together as a single line item in the display area.

The textual message and the graphical indication may be displayed laterally adjacent one another in the display area.

The awareness-enhancing indication may also be indicative of a target value of the dynamic parameter.

The graphical indication may also be indicative of a target value of the dynamic parameter.

The graphical indication may be indicative of a difference between the substantially real-time value of the dynamic parameter and the target value of the dynamic parameter.

The graphical indication may dynamically indicate a change in the substantially real-time value of the dynamic parameter relative to the target value of the dynamic parameter.

The target value of the dynamic parameter may be indicative of a conclusion of the relevant condition.

The method may comprise removing the awareness-enhancing indication from the display area upon conclusion of the relevant condition.

In another aspect, the disclosure describes a crew alerting system for a mobile platform. The system comprises:
- a display device defining a display area;
- a data processor operatively coupled to the display device; and
- machine-readable memory operatively coupled to the data processor and storing instructions executable by the processor and configured to cause the processor to:
  - using data indicative of an existence of a relevant condition associated with the mobile platform and data indicative of a substantially real-time value of a dynamic parameter associated with the relevant condition where the dynamic parameter is indicative of an evolution of the relevant condition, generate an output for causing the display device to display an awareness-enhancing indication associated with the relevant condition in the display area, the awareness-enhancing indication comprising a textual message and a supplemental indication indicative of the substantially real-time value of the dynamic parameter associated with the relevant condition, the supplemental indication also being indicative of a target value of the dynamic parameter.

The instructions may be configured to cause the textual message and the supplemental indication to be displayed together as a single line item in the display area.

The instructions may be configured to cause the supplemental indication to be indicative of a difference between the substantially real-time value of the dynamic parameter and the target value of the dynamic parameter.

The target value of the dynamic parameter may be indicative of a conclusion of the relevant condition.

The supplemental indication may comprise a graphical indication.

The supplemental indication may comprise a textual indication.

In another aspect, the disclosure describes a display device for a crew alerting system of a mobile platform. The display device comprises:
- a display area associated with the crew alerting system of the mobile platform; and
- an awareness-enhancing indication displayed in the display area, the awareness-enhancing indication being associated with a relevant condition of the mobile platform, the awareness-enhancing indication comprising a textual message and a supplemental indication indicative of a dynamic parameter associated with the relevant condition and indicative of an evolution of the relevant condition, the graphical indication also being indicative of a target value of the dynamic parameter.

The textual message and the supplemental indication may be displayed together as a single line item in the display area.

The graphical indication may be indicative of a difference between a substantially real-time value of the dynamic parameter and the target value of the dynamic parameter.

The target value of the dynamic parameter may be indicative of a conclusion of the relevant condition.

The supplemental indication may comprise a graphical indication.

The supplemental indication may comprise a textual indication.

In another aspect, the disclosure describes a method for alerting a crew of a mobile platform of a relevant condition associated with the mobile platform using a display area of a crew alerting system of the mobile platform. The method may comprise:
- receiving data indicative of an existence of the relevant condition associated with the mobile platform;
- receiving data indicative of a substantially real-time value of a dynamic parameter associated with the relevant condition, the dynamic parameter being indicative of an evolution of the relevant condition; and
- displaying an awareness-enhancing indication associated with the relevant condition in the display area of the crew alerting system of the mobile platform, the awareness-enhancing indication comprising a textual message and a supplemental indication indicative of the substantially real-time value of the dynamic parameter associated with the relevant condition, the supplemental indication also being indicative of a target value of the dynamic parameter.

The method may comprise:
- receiving subsequent data indicative of the substantially real-time value of the dynamic parameter; and
- causing the supplemental indication to be updated based on the subsequent data.

The textual message and the supplemental indication may be displayed together as a single line item in the display area.

The supplemental indication may be indicative of a difference between the substantially real-time value of the dynamic parameter and the target value of the dynamic parameter.

The supplemental indication may dynamically indicate a change in the substantially real-time value of the dynamic parameter relative to the target value of the dynamic parameter.

The target value of the dynamic parameter may be indicative of a conclusion of the relevant condition.

The supplemental indication may comprise a graphical indication.

The supplemental indication may comprise a textual indication.

In another aspect, the disclosure describes an aircraft comprising a system as disclosed herein.

In another aspect, the disclosure describes an aircraft comprising a display device as disclosed herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure describes systems, display devices and methods associated with crew alerting systems of aircraft and other mobile platforms. Even though various aspects the present disclosure are described in the context of aircraft, it is understood that aspects disclosed herein are equally applicable to centralized alerting systems for other systems and mobile platforms (e.g., vehicles) such as trains, ships and busses for example. In various embodiments, the systems, display devices and methods disclosed herein may be considered to provide crew alerting systems of improved functionality compared to conventional crew alerting systems by providing awareness-enhancing indications tailored for evolving conditions while being mindful of the limited real estate available on an aircraft flight deck.

In various embodiments, the systems, display devices and methods disclosed herein may in some situations reduce or eliminate the need for a flight crew to consult one or more source(s) of information separate from the crew alerting system in order to supplement a text message provided by the crew alerting system. Accordingly, in some embodiments, the systems, display devices and methods disclosed herein may contribute toward enhancing awareness of the flight crew and reducing the flight crew's workload at (e.g., critical) times when the flight crew is being alerted of a relevant condition requiring the flight crew's attention.

Aspects of various embodiments are described through reference to the drawings.

Figure 1:
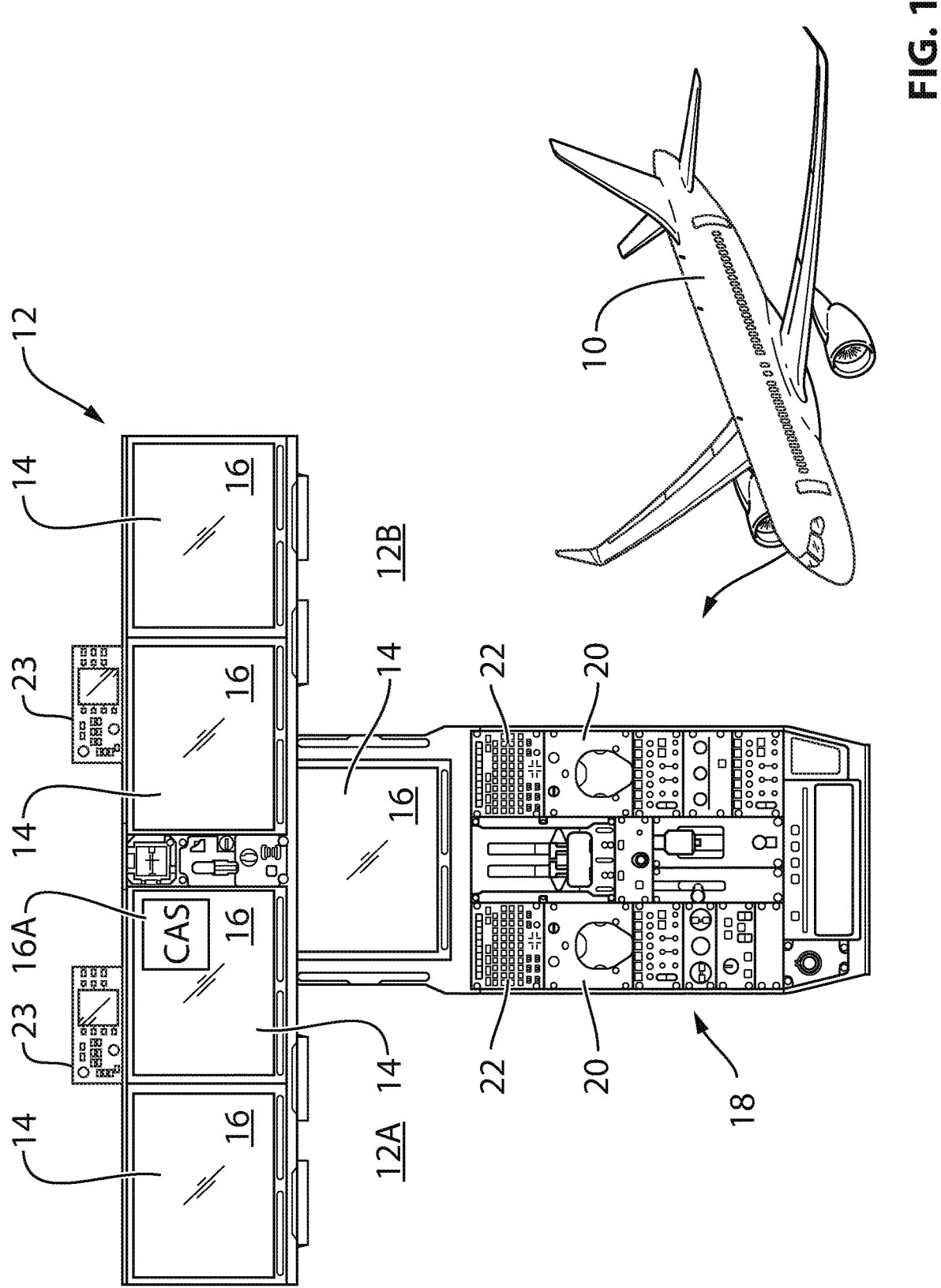
FIG. 1 shows an exemplary aircraft flight deck and a corresponding exemplary aircraft comprising the flight deck.

FIG. 1 shows an exemplary aircraft 10 (i.e., mobile platform) and a partial schematic representation of flight deck 12 which may be part of aircraft 10. Aircraft 10 may be a corporate, private, commercial or any other type of aircraft. For example, aircraft 10 may be a fixed-wing aircraft. In some embodiments, aircraft 10 may be a narrow-body, twin engine jet airliner. Flight deck 12 may comprise additional or fewer elements than those shown and described herein. Flight deck 12 may comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B may comprise functionally identical components so that at least some operational redundancy may be provided between left portion 12A and right portion 12B of flight deck 12. As used herein, the term "flight crew" is intended to encompass one or more individuals responsible for the operation of aircraft 10 during flight. Such individuals may, for example, include the pilot and/or the co-pilot. Similarly, the term "crew" is intended to encompass one or more individuals responsible for or associated with the operation of a mobile platform comprising a crew alerting system as disclosed herein.

Flight deck 12 may comprise one or more display devices 14 providing respective display areas 16. In the exemplary configuration of flight deck 12 shown in FIG. 1, left portion 12A and right portion 12B may each comprise two display devices 14 and an additional display device 14 may be provided in pedestal region 18 of flight deck 12. Display device 14 provided in pedestal region 18 may be shared between the pilot and the co-pilot during normal operation of aircraft 10. Display devices 14 may include one or more cathode-ray tubes (CRTs), liquid crystal displays (LCDs), plasma displays, light-emitting diode (LED) based displays or any known or other type of display device that may be suitable for use in flight deck 12. Display devices 14 may be configured to dynamically display operational and status information about various systems of aircraft 10, information related to flight/mission planning, maps and any other information that may be useful for the flight crew (e.g., pilot(s)) during the operation of aircraft 10. Display devices 14 may facilitate dialog between the flight crew and various systems of aircraft 10 via suitable graphical user interfaces. Flight deck 12 may comprise one or more data input devices such as, for example, one or more cursor control devices 20, one or more multi-function keypads 22 and one or more (e.g., standalone or multifunction) controllers 23 that may permit data entry by the flight crew. For example, such controller(s) 23 may be disposed in the glare shield above one or more display devices 14.

One or more of display devices 14 may comprise CAS display area 16A dedicated to centralized crew alerting system 24 shown schematically in FIG. 2 and referred hereinafter as "CAS 24", during one or more phases of operation of aircraft 10. In some embodiments, a single instance of CAS display area 16A may be displayed on a display device 14 that is conveniently located to be visible by both the pilot and the co-pilot. Alternatively, in some embodiments, more than one instance of CAS display area 16A may be displayed on more than one respective display device 14. In some embodiments, the display device 14 on which CAS display area 16A is provided may also include engine indications and therefore CAS display area 16A may be part of an engine indication and crew alerting system (EICAS). In some embodiments, CAS display area 16A may be selectively displayed on one or more display devices 14 of flight deck 12 based on input from the flight crew.

It is understood that CAS display area 16A and the display of its contents is not limited to one or more display devices 14 onboard aircraft 10. For example, CAS display area 16A could, alternatively or in addition, be provided on a display device that is off of aircraft 10. For example, CAS display area 16A could be provided on a display device of a ground station to alert a ground-based operator of aircraft 10 or support (e.g., maintenance) personnel. Hence, even though the present disclosure refers to alerting a flight crew of aircraft 10, it is understood that relevant information could be transmitted from aircraft 10 to a location remote from aircraft 10 (e.g., ground station) in order to alert an individual at such location in accordance with aspects of the present disclosure.

Figure 2:
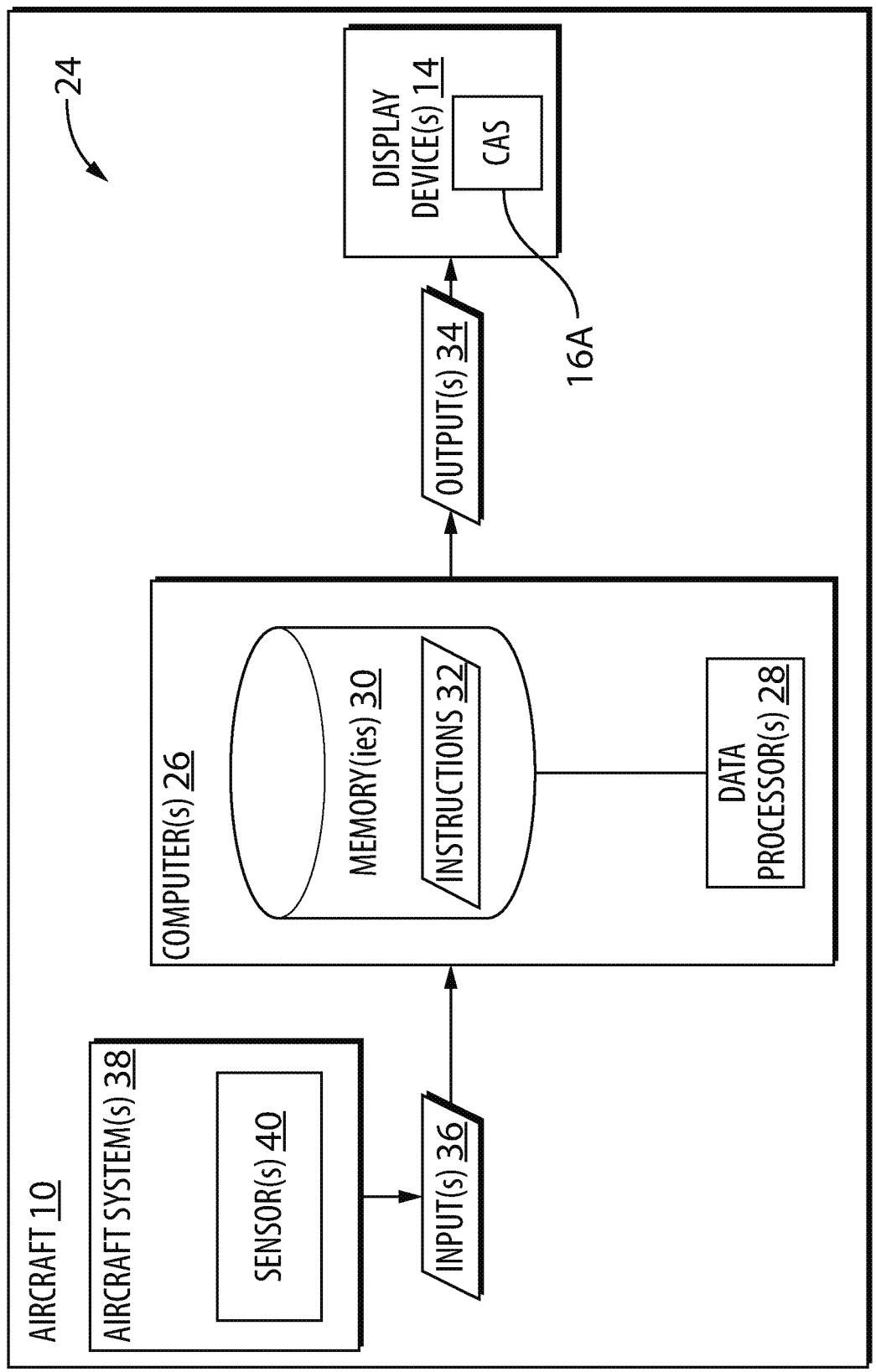
FIG. 2 shows a schematic representation of an exemplary crew alerting system of the aircraft of FIG. 1.

FIG. 2 shows a schematic representation of an exemplary CAS 24 which may be part of aircraft 10. CAS 24 may be integrated with flight deck 12. CAS 24 may comprise one or more computers 26 (referred hereinafter in the singular) operatively coupled to one or more display devices 14 (referred hereinafter in the singular) of flight deck 12. Computer 26 may comprise one or more data processors 28 (referred hereinafter in the singular) and one or more computer-readable memories 30 (referred hereinafter in the singular) storing machine-readable instructions 32 executable by data processor 28 and configured to cause data processor 28 to generate one or more outputs 34 (referred hereinafter in the singular). Output 34 may comprise one or more signals for causing display device 14 of aircraft 10 to display CAS display area 16A and its contents.

Computer 26 may receive input(s) 36 in the form of data or information that may be processed by data processor 28 based on instructions 32 in order to generate output 34. For example, input 36 may comprise information (data) indicative of an existence of a relevant condition associated with one or more systems 38 of aircraft 10. In some embodiments, input 36 may alternatively or in addition comprise information (data) indicative of a substantially real-time value of a dynamic parameter associated with the relevant condition pertaining to the one or more systems 38 of aircraft 10. Such dynamic parameter may be indicative of an evolution of the relevant condition. In various embodiments, input(s) 36 may include or be indicative of sensed signals acquired via one or more (e.g., pressure, position, acceleration, temperature or other) sensors 40 associated with one or more aircraft systems 38. Accordingly, input(s) 36 may comprise one or more sensed parameters indicative of one or more states of aircraft system(s) 38. As described further below, computer 26 may, based on input(s) 36, generate output 34 for causing display device 14 to display one or more awareness-enhancing indications as described below and associated with the relevant condition in CAS display area 16A.

Computer 26 may be part of an avionics suite of aircraft 10. For example, in some embodiments, computer 26 may carry out additional functions than those described herein including the management of one or more graphic user interfaces of flight deck 12 and/or other part(s) of aircraft 10. In various embodiments, computer 26 may comprise more than one computer or data processor where the methods disclosed herein (or part(s) thereof) could be performed using a plurality of computers or data processors, or, alternatively, be performed entirely using a single computer or data processor. In some embodiments, computer 26 could be physically integrated with (e.g., embedded in) display device 14.

Data processor 28 may comprise any suitable device(s) configured to cause a series of steps to be performed by computer 26 so as to implement a computer-implemented process such that instructions 32, when executed by computer 26 or other programmable apparatus, may cause the functions/acts specified in the methods described herein to be executed. Data processor 28 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 30 may comprise any suitable known or other machine-readable storage medium. Memory 30 may comprise non-transitory computer readable storage medium such as, for example, but not limited to, an electronic, magnetic, optical, electromagnetic, infrared, or semiconductor system, apparatus, or device, or any suitable combination of the foregoing. Memory 30 may include a suitable combination of any type of computer memory that is located either internally or externally to computer 26 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 30 may comprise any storage means (e.g. devices) suitable for retrievably storing machine-readable instructions 32 executable by data processor 28.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 30) having computer readable program code (e.g., instructions 32) embodied thereon. The computer program product may, for example, be executed by computer 26 to cause the execution of one or more methods disclosed herein in entirety or in part.

Computer program code for carrying out operations for aspects of the present disclosure in accordance with instructions 32 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 26 or other data processing device(s). It is understood that, based on the present disclosure, one skilled in the relevant arts could readily write computer program code for implementing the methods disclosed herein.

In some embodiments, crew alerting system 24 may comprise display device 14 defining CAS display area 16A dedicated to crew alerting system 24. Data processor 28 of computer 26 may be operatively coupled to display device 14. Machine-readable memory 30 may be operatively coupled to data processor 28 and store instructions 32 executable by processor 28. Such instructions 32 may be configured to cause processor 28 to use data representative of input(s) 36 and generate output 34 configured to cause display device 14 to display one or more awareness-enhancing indications 42 (shown in FIG. 3).

The data used by data processor 28 may be indicative of an existence of a relevant condition associated with aircraft 10. The existence of such relevant condition may be based on the evaluation of a logical expression such as, for example, the comparison of a sensed value to a threshold value. Accordingly, the data indicative of the existence of such relevant condition may be binary in nature based on whether the logical expression evaluated is true or false. For example, such relevant condition may include a system degradation (e.g., failure), non-normal condition or state associated with one or more of aircraft systems 38.

The data used by data processor 28 may also be indicative of a substantially real-time value of a dynamic parameter associated with the relevant condition. Such real-time value may be associated with a dynamic parameter of one or more aircraft systems 38 and acquired via sensor 40. The dynamic parameter may be indicative of an evolution of the relevant condition. Non-limiting examples of such dynamic parameter may include: a rotation speed (e.g., RPM) associated with an auxiliary power unit (APU) of aircraft 10 during start-up, a quantity of fuel remaining in a fuel tank of aircraft 10, an outside temperature indicating an icing risk, a position of a flight control surface of aircraft 10, a temperature inside a cabin of aircraft 10 and a pressure inside the cabin of aircraft 10. Aspects of the present disclosure are not intended to be limited to the specific relevant conditions and dynamic parameters recited herein as examples. Instead, aspects of the present disclosure may be applicable to any suitable known or other relevant conditions that may be indicated via traditional or other aircraft crew alerting systems.

Figure 3:
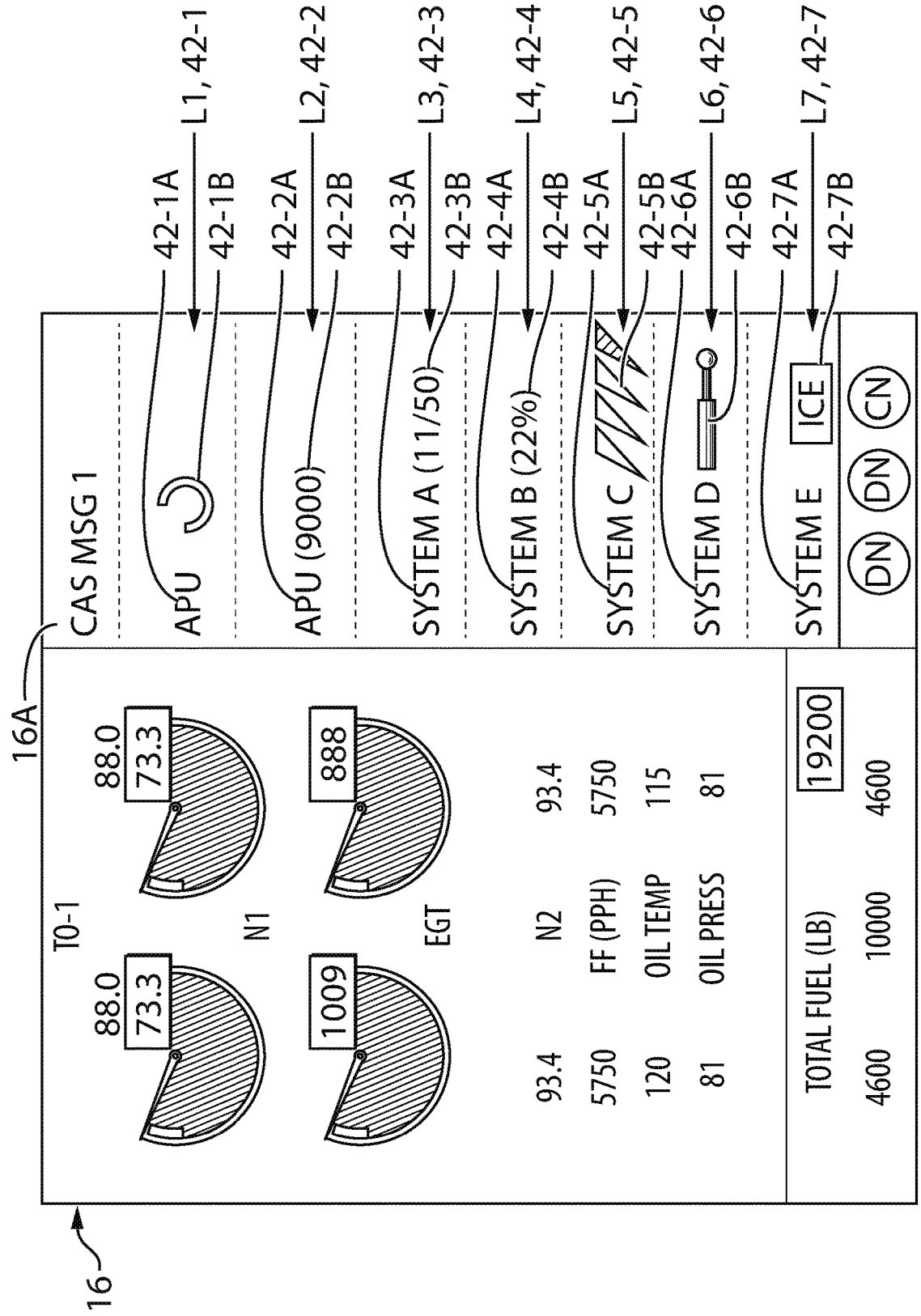
FIG. 3 shows an exemplary display area associated with the crew alerting system of FIG. 2 where the display area comprises a plurality of exemplary awareness-enhancing indications.

FIG. 3 shows an exemplary CAS display area 16A associated with CAS 24 of FIG. 2 where CAS display area 16A comprises a plurality of exemplary awareness-enhancing indications 42-1 to 42-7 (referred generically herein using reference character 42). CAS display area 16A may be a sub-region of larger display area 16 of display device 14. In the example shown in FIG. 3, CAS display area 16A is disposed adjacent to engine-related indications and therefore CAS display area 16A may, in some embodiments, be considered part of an EICAS. CAS display area 16A may comprise a plurality of line items L1-L7 (bars) together forming a "stack" of awareness-enhancing indications 42 where the order of awareness-enhancing indications 42 in the stack may, for example, be based on the criticality (i.e., priority) of the relevant condition, may be chronological or quasi-chronological, or, the order of awareness-enhancing indications 42 in the stack may be based on other factor(s).

In various embodiments, awareness-enhancing indication 42 may comprise one or more textual messages 42A (e.g., 42-1A to 42-7A shown in FIG. 3) and one or more supplemental indications 42B (e.g., 42-1B to 42-7B shown in FIG. 3). In some embodiments, textual message 42A may be relatively short (e.g., less than 21 characters) and may be binary in nature and displayed based on the evaluation of a logical expression. For example, textual message 42A may be displayed when the associated logical expression is true and may be hidden or removed from CAS display area 16A when the associated logical expression is false. Since supplemental indication 42B accompanies textual message 42A, it may also be displayed or hidden simultaneously with textual message 42A.

In some embodiments, all or part of awareness-enhancing indication 42 may be displayed in CAS display area 16A in a color that is indicative of the criticality or level of alert of the associated relevant condition to provide the flight crew a visual indication of priority in the event where multiple awareness-enhancing indications 42 may be displayed in CAS display area 16A. For example, red may be used for an awareness-enhancing indication 42 associated with a "warning-alert" level requiring immediate awareness and action by the flight crew, amber or yellow may be used for an awareness-enhancing indication 42 associated with a "caution-alert" level requiring immediate awareness and subsequent action by the flight crew, cyan may be used for an awareness-enhancing indication 42 associated with an "advisory" level requiring crew awareness, and, white may be used for an awareness-enhancing indication 42 associated with a system state.

Supplemental indication 42B may be indicative of a substantially real-time value of the dynamic parameter associated with the relevant condition and may accompany textual message 42A. Accordingly, supplemental indication 42B may be a dynamic indication providing a substantially real-time representation of the dynamic parameter as the relevant condition is evolving in order to enhance the awareness provided by textual message 42A. In some situations, the presentation of supplemental indication 42B may sufficiently supplement textual message 42A so that the flight crew may not require to consult a separate source of information (e.g., synoptic page) which may be located on a different display device 14, on a different page of the same or other display device 14, or in a display area 16 or region thereof that is different from CAS display area 16A. For example, supplemental indication 42B may provide information to the flight crew regarding the evolution, criticality and expected duration of a relevant condition. As shown in FIG. 3, supplemental indication 42B may accompany textual indication 42A in a single CAS display area 16A that is dedicated to CAS 24.

Awareness-enhancing indication 42 may provide information to the flight crew about the relevant condition in a clear and integrated manner that is intuitive and relatively easy to interpret by the flight crew. This and the single location of both the textual message 42A and supplemental indication 42B may contribute toward reducing the flight crew's workload during critical periods requiring the flight crew's attention.

Supplemental indication 42B may comprise a textual or a non-textual indication. For example, supplemental indication 42B may comprise an alphanumeric indication such as one or more numerical values and/or one or more textual indications that may substantially dynamically indicate the dynamic parameter associated with the relevant condition. Alternatively or in addition, supplemental indication 42B may comprise a graphical (e.g., pictorial) indication which may facilitate the interpretation of supplemental indication 42B by the flight crew. The term "graphical" is intended to encompass any non-textual indications such as, for example, pictures, diagrams, curves, colored labels, segments, carets, connectors, markers, analog gauges, icons and progress indicators such as bars and circles. The use of graphical indications may be preferred in some situations to facilitate the interpretation of supplemental indication 42B by providing "at-a-glance" information without having to read an alphanumeric message. Supplemental indication 42B may be dynamic so that subsequent data indicative of the substantially real-time value of the dynamic parameter may cause supplemental indication 42B to be automatically updated substantially in real-time based on such subsequent data.

In reference to FIG. 3, textual messages 42A and their accompanying supplemental indications 42B may be displayed together as single line items L1-L7 in CAS display area 16A in some embodiments. For example, textual message 42A and supplemental indication 42B may be displayed laterally adjacent one another and together in CAS display area 16A. Alternatively, textual message 42A and associated supplemental indication 42B may be displayed as adjacent line items L1-L7 in some embodiments due to a length of textual message 42A and/or an amount of display space required for associated supplemental indication 42B. In various embodiments, textual message 42A and associated supplemental indication 42B may be considered to be displayed together to achieve visual cohesion allowing textual message 42A and associated supplemental indication 42B to be interpreted together. In some embodiments, visual cohesion may be achieved by proximity of textual message 42A and associated supplemental indication 42B. For example, textual message 42A and associated supplemental indication 42B may be positioned to have a vertical and/or lateral space (gap) of less than about 0.5 inch (13 mm) between them.

In some embodiments, one or more textual messages 42A and associated supplemental indications 42B may coexist with conventional CAS messages (e.g., see "CAS MSG 1") as shown in CAS display area 16A.

In reference to line item L1, an exemplary awareness-enhancing indication 42-1 may comprise textual message 42-1A containing the letters "APU" accompanied by supplemental indication 42-1B comprising a circular progress indicator providing a substantially real-time indication of the dynamic parameter associated with the relevant condition. In this specific example, "APU" may represent an auxiliary power unit and the circular progress indicator of supplemental indication 42-1B may graphically and dynamically indicate an operating speed (e.g., RPM) of the auxiliary power unit during start-up of the auxiliary power unit. The circular progress indicator may graphically indicate the current operating speed of the auxiliary power unit relative to a target (e.g., threshold) operating speed by the dynamic extension of the arc in the counter-clockwise direction toward the top of the circle. The difference in angular position along the circular path between the end of the arc and the top of the circle may graphically indicate the difference between the current, substantially real-time operating speed and the target operating speed of the auxiliary power unit to be reached during start-up. The value of the target operating speed of the auxiliary power unit may be indicative of a conclusion of the start-up condition of the auxiliary power unit thereby indicating that the auxiliary power unit is ready to deliver its services (e.g., electricity and pressurized air). Accordingly, when the target operating speed of the auxiliary power unit is reached (e.g., the arc completely fills the circle), the logical expression causing awareness-enhancing indication 42-1 to be displayed may no longer be true and awareness-enhancing indication 42-1 may then be removed from CAS display area 16A and thereby indicate a conclusion of the relevant condition. In some embodiments, awareness-enhancing indication 42-1 may be replaced by another message once the logical expression is no longer true. The difference between the current, substantially real-time operating speed and the target operating speed of the auxiliary power unit may provide an indication of criticality and duration of the relevant condition associated with awareness-enhancing indication 42-1.

In reference to line item L2, another exemplary awareness-enhancing indication 42-2 may comprise textual message 42-2A containing the letters 'APU' accompanied by supplemental indication 42-2B comprising a numerical value "9000" dynamically providing a substantially real-time indication of the dynamic parameter associated with the relevant condition. In this example, "APU" may again represent an auxiliary power unit and the supplemental indication 42-2B may numerically and dynamically indicate an operating speed (e.g., RPM) of the auxiliary power unit during start-up of the auxiliary power unit to increase the awareness of the flight crew. When the target operating speed of the auxiliary power unit is reached, the logical expression causing awareness-enhancing indication 42-2 to be displayed may no longer be true and awareness-enhancing indication 42-2 may then be removed from CAS display area 16A thereby indicating a conclusion of the relevant condition. In some embodiments, awareness-enhancing indication 42-2 may be replaced by another message once the logical expression is no longer true.

In reference to line item L3, another exemplary awareness-enhancing indication 42-3 may comprise textual message 42-3A containing the letters "SYSTEM A" accompanied by supplemental indication 42-3B comprising a numerical value "11/50" dynamically providing a substantially real-time indication of the dynamic parameter associated with the relevant condition. In this example, the value "11" of supplemental indication 42-3B may numerically and dynamically indicate a current, substantially real-time value of the dynamic parameter and the value "50" of supplemental indication 42-3B may numerically indicate a target value of the dynamic parameter indicating a conclusion of the relevant condition. Accordingly, when the target value of the dynamic parameter is reached, the logical expression causing awareness-enhancing indication 42-3 to be displayed may no longer be true and awareness-enhancing indication 42-3 may then be removed from CAS display area 16A thereby indicating a conclusion of the relevant condition. In some embodiments, awareness-enhancing indication 42-2 may be replaced by another message once the logical expression is no longer true. The numerical difference between the current, substantially real-time value of the dynamic parameter and the target value of the dynamic parameter may provide an indication of criticality and duration of the relevant condition indicated by awareness-enhancing indication 42-3.

In reference to line item L4, another exemplary awareness-enhancing indication 42-4 may comprise textual message 42-4A containing the letters "SYSTEM B" accompanied by supplemental indication 42-4B comprising a textual indication "22%" dynamically providing a substantially real-time indication of the dynamic parameter associated with the relevant condition as a percentage of a target value of the dynamic parameter indicating a conclusion of the relevant condition. Awareness-enhancing indication 42-4 may otherwise have characteristics as described above in relation to other awareness-enhancing indications.

In reference to line item L5, another exemplary awareness-enhancing indication 42-5 may comprise textual message 42-5A containing the letters "SYSTEM C" accompanied by supplemental indication 42-5B comprising a graphical indication in the form of a progress bar/indicator dynamically providing a substantially real-time indication of the dynamic parameter associated with the relevant condition relative to a target value of the dynamic parameter indicating a conclusion of the relevant condition. Awareness-enhancing indication 42-5 may otherwise have characteristics as described above in relation to other awareness-enhancing indications.

In reference to line item L6, another exemplary awareness-enhancing indication 42-6 may comprise textual message 42-6A containing the letters "SYSTEM D" accompanied by supplemental indication 42-6B comprising a graphical indication in the form of a dynamic icon of an actuator where the deployment or retraction of the actuator is graphically and dynamically displayed. The dynamic icon of supplemental indication 42-6B may provide a substantially real-time graphical indication of the current deployed position of the actuator relative to a target position. The dynamic icon of supplemental indication 42-6B may provide a substantially real-time graphical indication of the direction of movement of the actuator to increase awareness of the flight crew. Awareness-enhancing indication 42-6 may otherwise have characteristics as described above in relation to other awareness-enhancing indications.

In reference to line item L7, another exemplary awareness-enhancing indication 42-7 may comprise textual message 42-7A containing the letters "SYSTEM E" accompanied by supplemental indication 42-7B comprising a graphical indication in the form of a dynamic icon indicating "ICE" associated with a de-icing system of aircraft 10. The dynamic icon may in the form of a progress bar analogous to supplemental indications 42-1B and 42-5B. Alternatively or in addition, the dynamic icon of supplemental indication 42-7B may be a colored indicator where a transition in the displayed color(s) may provide a graphical and substantially real-time indication of the associated dynamic parameter. For example, the dynamic icon may transition from red to green to provide a substantially real-time indication of the progress of the relevant condition towards a target state of the dynamic parameter. Awareness-enhancing indication 42-7 may otherwise have characteristics as described above in relation to other awareness-enhancing indications.

Figure 4:
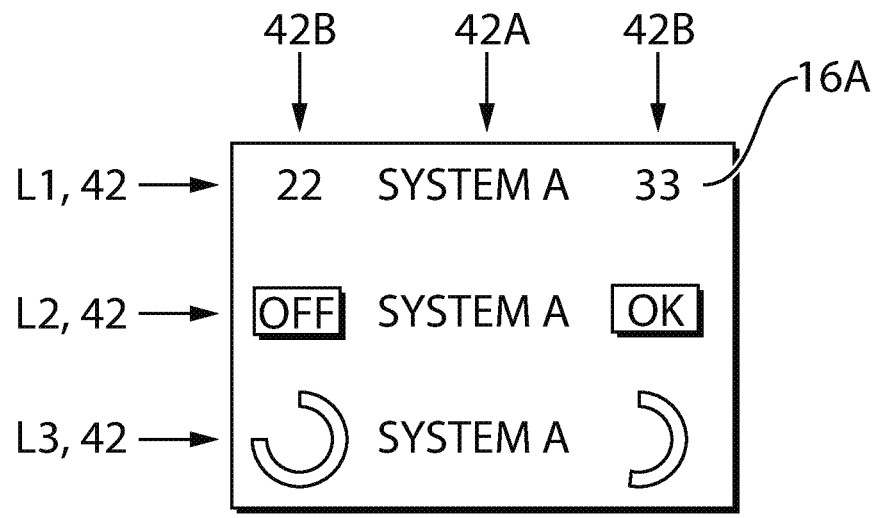
FIG. 4 shows additional exemplary awareness-enhancing indications that may be displayed on the display area of FIG. 3.

FIG. 4 shows three additional exemplary awareness-enhancing indications 42 as separate line items L1-L3 that may be displayed on CAS display area 16A. The awareness-enhancing indications 42 of FIG. 4 may generally comprise similar textual messages 42A and supplementary indications 42B as previously described. However, each awareness-enhancing indications 42 of FIG. 4 may comprise more than one (e.g., two or more) supplementary indications 42B where each supplementary indication 42B may be associated with a respective dynamic parameter. For example, where system A has a relevant condition on a left side of aircraft 10 and a relevant condition on the right side of aircraft 10, each associated with a respective dynamic parameter, then two supplementary indications 42B may be provided to represent the evolution of the dynamic parameter of each relevant condition. Accordingly, a plurality of dynamic parameters may be dynamically indicated substantially in real-time in order to indicate the evolution of the relevant condition causing the display of such awareness-enhancing indications 42.

Figure 5:
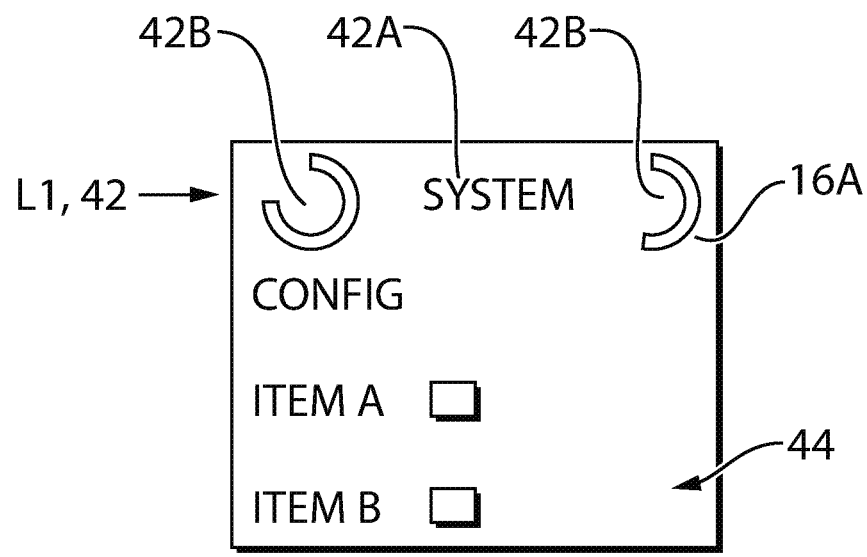
FIG. 5 shows an exemplary expanded display area associated with an exemplary awareness-enhancing indication.

FIG. 5 shows an exemplary expanded area 44 associated with another exemplary awareness-enhancing indication 42. Expanded area 44 may normally be hidden and be selectively displayed by action of the flight crew. For example, a movable cursor may be brought over line item L1 containing awareness-enhancing indication 42 and actuated (i.e., by clicking on line item L1) in order to cause expanded area 44 to be shown. Alternatively, expanded area 44 may always be displayed when awareness-enhancing indication 42 is shown depending on the awareness need or preference for the particular system 38. Expanded area 44 may comprise additional information related to the relevant condition associated with awareness-enhancing indication 42. In some embodiments, expanded area 44 may display checklist items associated with the relevant condition to be performed by the flight crew. In some embodiments, expanded area 44 may comprise one or more actuatable widgets (e.g., check boxes, buttons, etc.) associated with a sensed checklist for example. In some embodiments, expanded area 44 may comprise actuatable widgets configured to permit the flight crew to activate, deactivate or otherwise control one or more systems 38 of aircraft 10.

Figure 6:
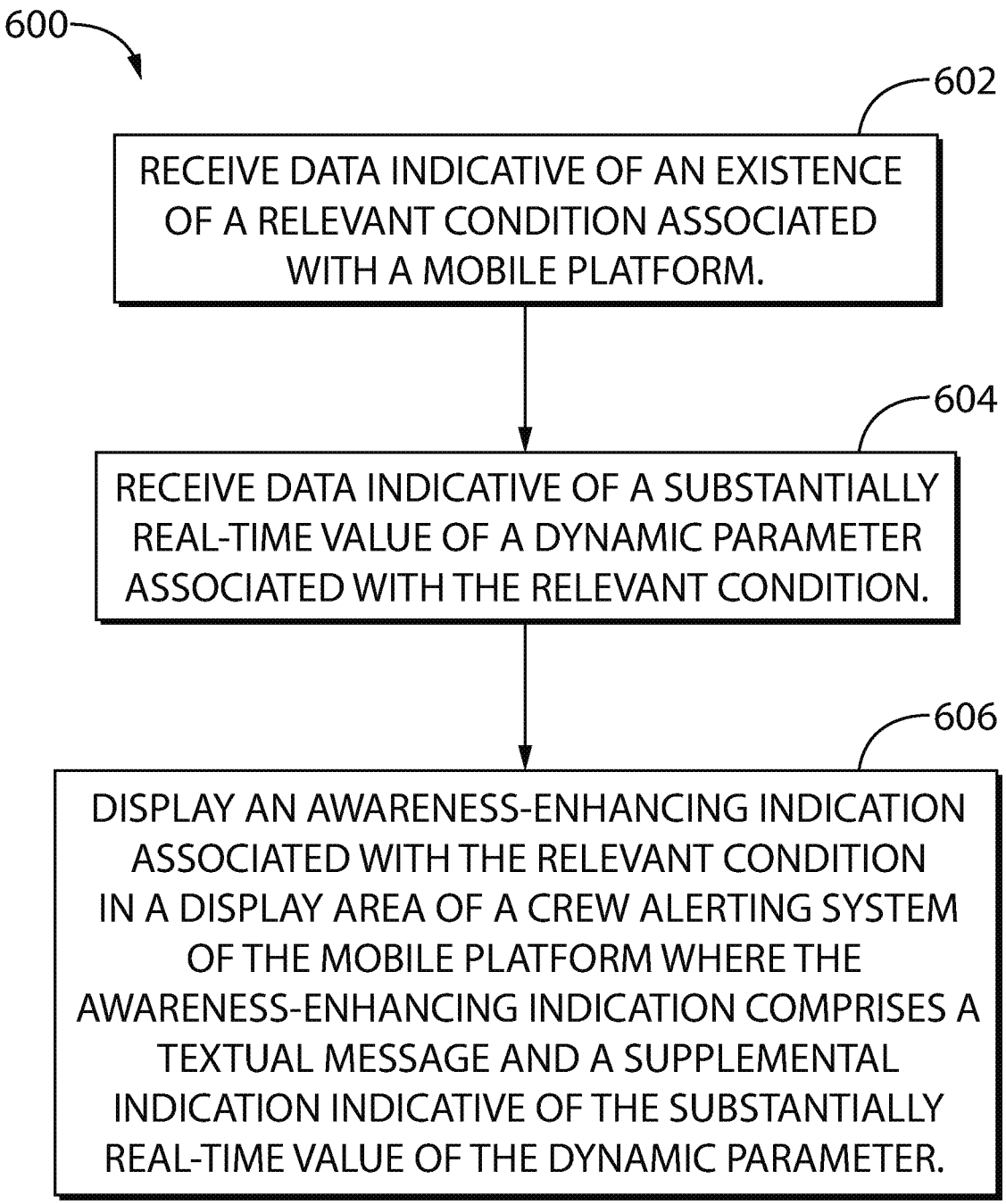
FIG. 6 is a flowchart illustrating an exemplary method for alerting a crew of a mobile platform such as the aircraft of FIG. 1 of a relevant condition associated with the mobile platform.

FIG. 6 is a flowchart illustrating an exemplary method 600 for alerting a flight crew of aircraft 10 of a relevant condition associated with aircraft 10. Method 600 may also be used for alerting a crew of a mobile platform of a relevant condition. Method 600 may be performed using CAS 24 as described above. In various embodiments, method 600 may comprise: receiving data indicative of an existence of the relevant condition associated with aircraft 10 (see block 602); receiving data indicative of a substantially real-time value of a dynamic parameter associated with the relevant condition where the dynamic parameter is indicative of an evolution of the relevant condition (see block 604); and displaying awareness-enhancing indication 42 associated with the relevant condition in CAS display area 16A of CAS 24 of aircraft 10 where awareness-enhancing indication 42 comprises textual message 42A and supplemental indication 42B indicative of the substantially real-time value of the dynamic parameter associated with the relevant condition (see block 606).

In some embodiments, supplemental indication 42B may comprise a graphical indication and/or a textual indication. Supplemental indication 42B may dynamically indicate a substantially real-time value of the dynamic parameter. For example, method 600 may comprise receiving subsequent data indicative of the substantially real-time value of the dynamic parameter; and causing the graphical and/or textual supplemental indication 42B to be updated based on the subsequent data.

In some embodiments, textual message 42A and supplemental indication 42B may be displayed together as a single line item L1-L7 in CAS display area 16A. For example, textual message 42A and supplemental indication 42B may be displayed laterally adjacent one another in CAS display area 16A. In various embodiments, textual message 42A and supplemental indication 42B may be displayed in any suitable manner to achieve visual cohesion allowing textual message 42A and associated supplemental indication 42B to be interpreted together.

Supplemental indication 42B of awareness-enhancing indication 42 may be indicative of a target (e.g., threshold) value of the dynamic parameter. In some embodiments, supplemental indication 42B may, for example, be indicative of a difference between the substantially real-time value of the dynamic parameter and the target value of the dynamic parameter. In some embodiments, supplemental indication 42B may, for example, dynamically indicate a change in the substantially real-time value of the dynamic parameter relative to the target value of the dynamic parameter.

Such target value of the dynamic parameter may be indicative of a conclusion of the relevant condition. Accordingly, method 600 may comprise removing awareness-enhancing indication 42 from CAS display area 16A upon conclusion of the relevant condition (e.g., when the substantially real-time value of the dynamic parameter has reached the target value).

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices and methods disclosed and shown herein may comprise a specific number of elements/steps, the systems, devices and methods could be modified to include additional or fewer of such elements/steps. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for alerting a crew of a mobile platform of relevant conditions associated with the mobile platform using a display area of a crew alerting system of the mobile platform, the method comprising:
   receiving data indicative of an existence of the relevant conditions associated with the mobile platform;
   receiving data indicative of substantially real-time values of dynamic parameters respectively associated with the relevant conditions, each dynamic parameter being indicative of an evolution of a corresponding one of the relevant conditions; and
   displaying a plurality of awareness-enhancing indications respectively associated with the relevant conditions in the display area of the crew alerting system of the mobile platform, each awareness-enhancing indication comprising a textual message and a supplemental indication indicative of one of the substantially real-time values of the dynamic parameters displayed together as a single line item in the display area, the display area comprising a plurality of line items together forming a stack of awareness-enhancing indications, an order of the awareness-enhancing indications in the stack being chronological or quasi-chronological, or based on a criticality of the relevant conditions, at least one of the supplemental indications also being indicative of a target value of a corresponding one of the dynamic parameters.

2. The method as defined in claim 1, comprising:
   receiving subsequent data indicative of an updated one of the substantially real-time values of the dynamic parameters; and
   causing a corresponding one of the supplemental indications to be updated based on the subsequent data.

3. The method as defined in claim 1, wherein the textual message and the supplemental indication of each awareness-enhancing indication are displayed together laterally adjacent one another.

4. The method as defined in claim 1, wherein the at least one of the supplemental indications is indicative of a difference between a corresponding one of the substantially real-time values of the dynamic parameters and a corresponding one of the target values of the dynamic parameters.

5. The method as defined in claim 1, wherein the at least one of the supplemental indications dynamically indicates a change in a corresponding one of the substantially real-time values of the dynamic parameters relative to a corresponding one of the target values of the dynamic parameters.

6. The method as defined in claim 1, wherein the target values of the dynamic parameters are indicative of a conclusion of the relevant conditions.

7. The method as defined in claim 1, wherein at least one of the supplemental indications comprises a graphical indication.

8. The method as defined in claim 1, wherein at least one of the supplemental indications comprises a textual indication.

* * * * *